Feb. 27, 1951     E. F. SALSBURY     2,543,337
AUTOMATICALLY VARIABLE VEHICLE POWER TRANSMISSION
Filed Feb. 10, 1947     2 Sheets-Sheet 1

INVENTOR:
ESLEY F. SALSBURY
BY HIS ATTORNEYS
HARRIS, KIECH, FOSTER & HARRIS

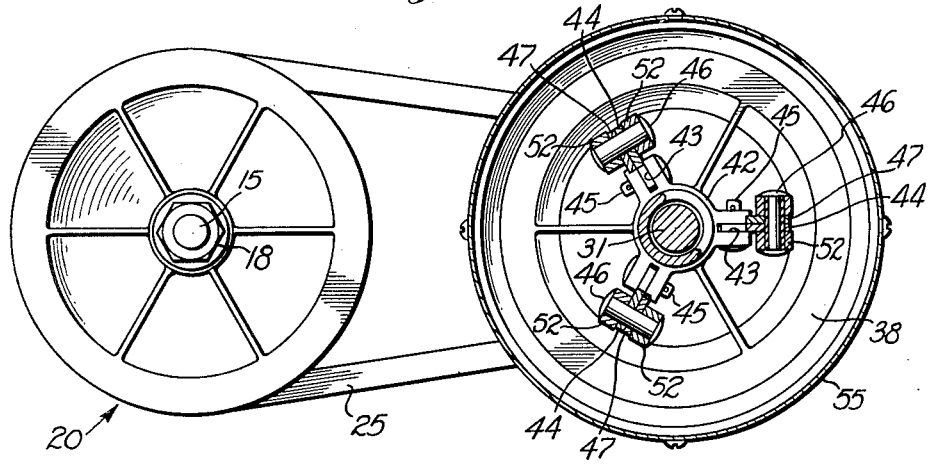
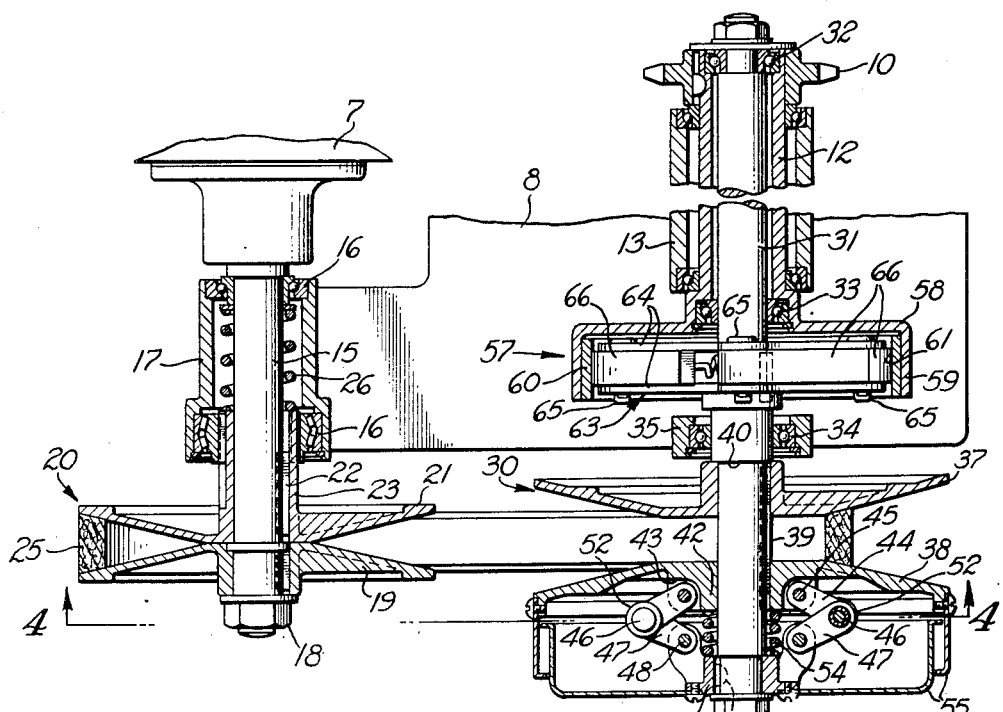

Patented Feb. 27, 1951

2,543,337

UNITED STATES PATENT OFFICE 2,543,337

AUTOMATICALLY VARIABLE VEHICLE POWER TRANSMISSION

Esley F. Salsbury, Los Angeles, Calif., assignor to Salsbury Corporation, a corporation of California Application February 10, 1947, Serial No. 727,547

5 Claims. (Cl. 180—33)

This invention relates to motor vehicles such as motor-driven bicycles or tricycles and particularly to a combined power transmission mechanism disposed between the engine and a driven road-engaging wheel of the vehicle.

The invention has for its objective the provision of a novel variable speed power transmission mechanism adapted particularly for use in motor-driven vehicles.

Further objects of the invention will be apparent from the following specification and the drawings, in which;

Fig. 3 is a view similar to Fig. 2 but illustrating the relationship of the parts when the engine is operating at comparatively high speed; and Fig. 4 is a cross-sectional view on line 4—4 of Fig. 3.

Figure 2:
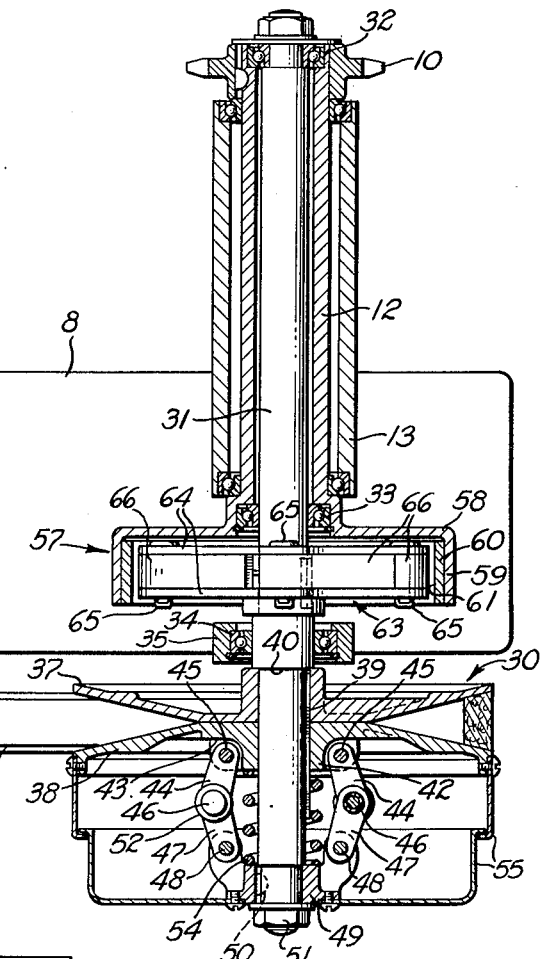
Fig. 2 is a longitudinal sectional view through the transmission mechanism showing the relationship of the parts thereof when the engine is idling.
Figure 1:
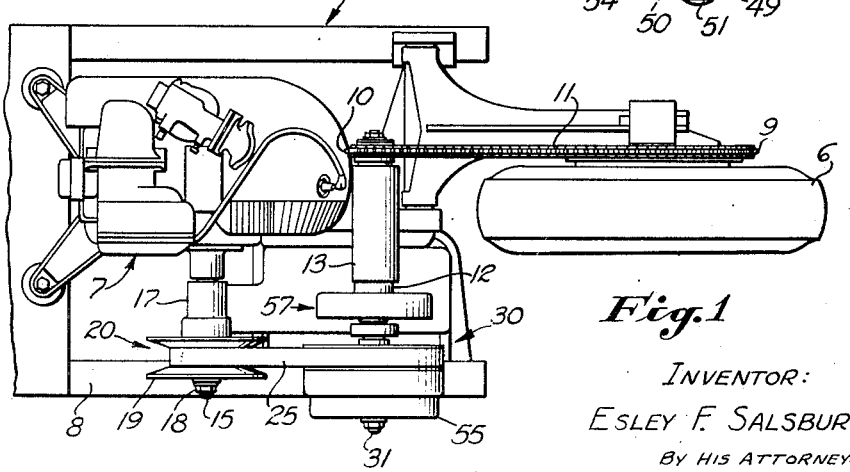
Fig. 1 is a bottom view of one end of a motor-driven vehicle having a single driving wheel which is adapted to be driven from an engine through means of the present improved power transmission mechanism.

In motor driven vehicles it is common to use variable ratio speed reduction gears, that is, gears by which the speed ratio may be varied manually. In the ordinary vehicle the speed ratio may be varied from a value of, say, three to a value of one. When the speed reduction gear has a value of three, the vehicle is said to be in "low" gear, and when it has a value of one, it is said to be in "high" gear.

In the common types of automobiles having a clutch and variable ratio speed reduction gear, it is common practice to have the operator control the engagement and disengagement of the clutch through a clutch pedal operated ordinarily by the left foot and to control the speed ratio of the speed reduction gear by a gear shift lever operated by the right-hand of the operator.

It is an object of my invention to provide a power transmission mechanism including a clutch and a speed reduction gear for use in motor vehicles with which it is unnecessary to provide any mechanical means, such as a clutch pedal, to operate the clutch or a gear shift lever to control the speed ratio of the speed reduction gear, the operation of both the clutch and speed reduction gear being automatically performed to suit the needs of the vehicle in actual operation.

It is an object of my invention to provide a light vehicle having a power transmission through which the engine, or motor, drives the rear driving wheel and which is entirely automatic in the sense that the transmission has a main clutch which engages and disengages automatically, this engagement and disengagement being effected and controlled automatically by an increase or decrease of driven shaft speed above or below a critical speed and the transmission also includes a variable speed belt drive the ratio of transmission of which is dependent solely on the speed of rotation of the driven shaft and is hence a direct function of vehicle speed when the clutch is engaged.

Various attempts have been made to devise automatic transmissions for vehicles so that the operator of the vehicle would not have to operate a clutch pedal to connect and disconnect the motor from the driving mechanism and operate a gear shift lever to control the ratio of engine speed to wheel speed.

The mechanism disclosed herein makes it possible to dispense with direct manual or pedal control of both the clutch and transmission. This is accomplished by making the operation of the clutch dependent solely on driven shaft speed and the operation of the transmission dependent solely on rear wheel or vehicle speed whenever said clutch is engaged.

The elimination of the necessity of manual operation of the clutch and transmission greatly simplifies vehicle operation and construction and makes a light-weight vehicle such as is described hereinafter. Such a vehicle is low in first cost and operates at a low cost.

More important, it provides a vehicle that has great mobility, as the operator is relieved of several operations necessary in driving other types of vehicles.

To accomplish these and other desired objects I provide a V-belt transmission which may assume a low gear position in which, with the engine running at a constant speed, the transmission can propel the vehicle at a slow speed or which may assume a high gear position in which, with the engine running at this constant speed, the transmission can propel the vehicle at a higher speed. I also provide means by which said transmission is shifted from low gear to high gear as the speed of the vehicle is increased or from high gear to low gear as the speed of the vehicle is diminished.

The operation of this V-belt transmission is automatic at all times, its transmission ratio being dependent on, and a function of, the speed of the driven shaft.

To render such a transmission fully effective I also provide a main clutch for connecting the power receiving end of said transmission to the engine, this main clutch being inoperative so that the engine can rotate without delivering power to the transmission when the driven shaft is rotating below a critical speed and automatically rendered operative when the driven shaft is rotated at or above said speed.

The operation of this main clutch is automatic at all times, its operation being solely dependent on driven shaft speed. The clutch engages whenever the driven shaft rotates above a critical speed and disengages whenever the driven shaft rotates below that speed.

Referring to the drawings in detail, my improved power transmission mechanism is shown as applied to use in a motor-driven vehicle 5 which may be of the so-called "scooter" type in which the rear wheel 6 is driven from an internal combustion engine 7 mounted on the vehicle frame 8. Secured to the driving wheel 6 is a sprocket 9 which is driven from a smaller sprocket 10 by means of a drive-chain 11. The sprocket 10 is secured to one end of a sleeve 12 which is rotatable in an elongated bearing 13 carried by the frame 8. The sleeve 12 is adapted to be driven from the drive-shaft 15 of the engine 7 by a power transmission mechanism constructed as next described.

The drive-shaft or crank-shaft 15 of the engine 7 is rotatable in suitable bearings in the engine casing and its projecting end may be rotatably supported in anti-friction bearings 16 held in a fixed bearing boss 17. Keyed to the outer end of the shaft 15 and held in place thereon by a nut 18 is the outer face member 19 of a driving pulley 20. The inner face member 21 of the pulley 20 is splined to the shaft 15 at 22 and has a hub 23 which is keyed to the inner race of the outer bearings 16. The members 19 and 21 of the pulley 20 have conical adjoining faces to adapt them to receive a V-belt 25 therebetween. A coil spring 26 surrounding the shaft 15 between the inner bearing 16 and the inner end of the hub 23 serves to normally urge the face member 21 toward the face member 19.

The V-belt 25 also passes around a driven pulley 30 carried on a countershaft 31. The countershaft 31 is herein sometimes referred to as the driven shaft as it is driven by the belt 25 of the transmission. The shaft 15 is sometimes referred to as the drive shaft. The countershaft 31 is rotatably mounted in anti-friction bearings 32 and 33 held in the sleeve 12 and in a third similar bearing 34 held in a fixed bearing boss 35. The driven pulley 30 comprises an inner face member 37 and an outer face member 38 each formed with conical adjoining faces to adapt them to receive the V-belt 25 therebetween. The members 37 and 38 are splined to the shaft 31 as indicated at 39. The hub of the inner member 37 is held against a shoulder 40 on the shaft by the V-belt 25 while the outer member 38 is adapted to be slid axially toward and away from the member 37 to vary the effective pitch diameter of the pulley 30 and the effective pitch diameter of the pulley 20. The hub 42 of the outer pulley member 38 is provided with slots 43 for receiving the inner ends of links 44 which are pivotally mounted therein on pins 45 (Figs. 3 and 4). The outer ends of the links 44 are pivotally connected by pins 46 to the inner ends of links 47, the outer ends of the links 47 being pivoted on pins 48 carried by a collar 49 keyed to the outer end of the countershaft 31 at 50 and secured thereon by a nut 51. Carried by the connecting pins 46 are weights 52 which are adapted to be acted upon by centrifugal force developed by rotating the shaft 31 to cause the links 44 and 47 to move from the position shown in Fig. 2 to that illustrated in Fig. 3 against the action of a coil spring 54 surrounding the countershaft 31 between the collar 49 and the hub 42 of the outer pulley member 38 to draw the latter outwardly and thus reduce its effective pitch diameter. A two-part closure member 55 may be employed for enclosing the centrifugally-operated means.

The counershaft or driven shaft 31 is adapted to be clutched to the driving sleeve 12 by a clutch device, indicated generally at 57. The clutch device 57 may be of any suitable centrifugally-actuated type, such as that described in detail in United States Patent No. 2,275,046 issued to F. W. Harris on March 3, 1942, and owned by the assignee of the present application. Suffice it to state that the clutch device 57 consists of a dish-shaped clutch member 58 formed integral with the sleeve 12 at the forward end thereof and having a projecting annular rim 59, to the interior of which is secured an annular lining 60 of friction material providing a clutch face 61. A driving clutch member 63 is secured to the countershaft 31 within the clutch member 58 and has opposite circular flanges 64 between which are pivoted, on pins 65, a plurality of weighted, centrifugally-actuated clutch shoes 66 adapted, when revolved with the countershaft 31 above a critical speed, to engage with the clutch face 61 to clutch the driving sleeve 12 to the counter-shaft 31 or driven shaft for rotation therewith.

The improved power transmission mechanism operates in the following manner: Assuming that the engine 7 is operating at low speed, or idling, the parts of the driving mechanism will assume the relationship shown in Fig. 2. That is to say, the drive shaft 15 of the engine 7 acts through its driving pulley 20 to rotate the driven pulley 30 through the medium of the V-belt 25. Since the V-belt 25 engages between the pulley face members 19 and 21 of the pulley 20 close to the axis of rotation thereof and between the pulley face members 37 and 38 of the pulley 30 at a point remote from the axis of rotation of the last-named pulley, a relatively high ratio exists between the relative speeds of the shafts 15 and 31 and the transmission is in "low gear" condition. During the idling of the engine 7, the shaft 31 is rotated at a speed insufficient to develop the centrifugal force necessary to actuate either the weighted links 44, 47 or the weighted clutch shoes 66 so that the parts of the pulley 30 will remain in the retracted position shown in Fig. 2 and the parts of the clutch 57 will remain de-clutched as also illustrated in Fig. 2. Thus, no driving action is imparted to the driving wheel 6 and the vehicle will remain at rest.

When the engine throttle is opened and the engine torque exceeds a predetermined value, sufficient power is transmitted through the belt 25 to cause the counter-shaft 31 to rotate at a higher rate of speed but in a "low gear" condition. Such rotation of the shaft 31 will pivot the centrifugally-actuated shoes 66 outwardly to cause them to lightly engage the clutch surface 61 so that the sleeve 12 and the wheel 6 will be driven to start forward movement of the vehicle. Due to the fact that inertia of the vehicle must be overcome, slippage occurs between the shoes 66 and surface 61 until such time as the wheel 6 rotates at a speed which balances the engine torque. As the speed of the driving wheel 6 thus increases, the speed of the clutch member 58 likewise increases and as it approaches the speed of the clutch member 63 slippage between the shoes 66 and the surface 61 ceases and the sleeve 12 rotates at the same speed as the countershaft 31. As the countershaft speed further increases the centrifugally-actuated members 44, 47, 52 pivot radially outward to draw the pulley member 38 away from the pulley member 37. Under the influence of the spring 26, the pulley member 21 will move toward the pulley member 19 to force the V-belt 25 toward the left so that the effective pitch diameter of the pulley 20 is increased and the effective pitch diameter of the pulley 30 is decreased, thus changing the speed ratio between the shafts 15 and 31 to effect a higher gear drive. After the clutch engages, the speed of rotation of the driving wheel 6 is the controlling factor in varying the speed ratio. As the engine torque is increased, the centrifugally-actuated means 44, 47, 52 will move outwardly to a greater extent to cause the belt 25 to be shifted further toward the left so that eventually a "high gear" condition is effected. When this condition occurs, further increase in the rate of travel of the vehicle is obtained by merely opening the engine throttle to increase the engine torque and thus speed up the vehicle.

The result of the above operation is that the transmission ratio of the V-belt transmission changes automatically in inverse proportion to, and as a result of, changes in vehicle speed. When the vehicle is at rest, the transmission is in "low" gear. That is, the engine can run below a critical speed with the wheel 6 at rest. As the speed increases the clutch first engages and as the vehicle accelerates to higher speeds there is a corresponding change in the transmission ratio and the vehicle automatically goes into "high" gear. This change to and from low gear to and from high gear is entirely automatic and is entirely dependent upon vehicle speed. It is evident that when the vehicle slows down, relative motion of the various parts will occur in the reverse direction and, when the vehicle comes to a standstill, the belt 25 will again be in the position of greatest permissible pitch diameter on the driven pulley 30 and the centrifugally-actuated units 44, 47, 52 will again be retracted to their smallest operative circle as shown in Fig. 2, and the clutch is disengaged.

While the improved power transmission mechanism has been herein shown and described as embodied in a preferred form of construction, by way of example, it will be apparent that various changes may be made therein without departing from the spirit of the invention. Consequently, I do not wish to be limited to the exact embodiment herein disclosed but desire to be afforded the full scope of the appended claims.

I claim as my invention:

1. In a vehicle, the combination of: an engine having a driving shaft; a driving wheel; a variable speed transmission mechanism comprising a driven shaft, a driving pulley on said driving shaft, a driven pulley on the driven shaft, and a V-belt passing over said pulleys, the effective pitch diameter of which pulleys may be varied to vary the speed ratio of said mechanism; driving means through which said driven shaft can drive said driving wheel; a clutch adapted, when engaged, to transmit power from said driven shaft to said driving wheel; and centrifugally actuated members operatively connected to said driven pulley and adapted to vary the effective pitch diameter of said driven pulley to increase or reduce the ratio of said transmission mechanism as the speed of said driving wheel is reduced or increased.

2. In a vehicle, the combination of: an engine having a driving shaft; a driving wheel; a variable speed transmission mechanism comprising a driven shaft, a driving pulley on said driving shaft, a driven pulley on the driven shaft, and a V-belt passing over said pulleys, the effective pitch diameter of which pulleys may be varied to vary the speed ratio of said mechanism; driving means through which said driven shaft can drive said driving wheel; a centrifugally-operated clutch adapted, when engaged, to transmit power from said driven shaft to said driving wheel; and centrifugally actuated members operatively connected to said driven pulley and adapted to vary the effective pitch diameter of said driving and driven pulleys to increase or reduce the ratio of said transmission mechanism as the speed of said driving wheel is reduced or increased.

3. In a vehicle, the combination of: an engine having a driving shaft; a driving wheel; a variable speed transmission mechanism comprising a driven shaft, a driving pulley on said driving shaft, a driven pulley on the driven shaft, and a V-belt passing over said pulleys, the effective pitch diameter of which pulleys may be varied to vary the speed ratio of said mechanism; a sleeve surrounding said driven shaft and rotatable relative thereto; driving means through which said sleeve can drive said driving wheel; a centrifugally-operated clutch adapted, when engaged, to transmit power from said driven shaft to said sleeve and said driving wheel; and centrifugally actuated members operatively connected to said driven pulley and adapted to vary the effective pitch diameter of said driving and driven pulleys to increase or reduce the ratio of said transmission mechanism as the speed of said driving wheel is reduced or increased.

4. In a vehicle, the combination of: an engine having a driving shaft; a driving wheel; a variable speed transmission mechanism comprising a driven shaft, a driving pulley on said driving shaft, a driven pulley on the driven shaft, and a V-belt passing over said pulleys, the effective pitch diameter of which pulleys may be varied to vary the speed ratio of said mechanism; a sleeve surrounding said driven shaft and rotatable relative thereto, said sleeve having a clutch member formed integral therewith and provided with an internal annular clutch face; driving means through which said sleeve can drive said driving wheel; and centrifugally-actuated shoes carried by said driven shaft and adapted to engage said clutch face to drive said sleeve and said driving wheel; and centrifugally-actuated members operatively connected to said driven pulley and adapted to vary the effective pitch diameter of said driving and driven pulleys to increase or reduce the ratio of said transmission mechanism as the speed of said driving wheel is reduced or increased.

5. In a vehicle, the combination of: an engine having an engine shaft; a driving wheel; a wheel sprocket rigidly fixed on and driving said driving wheel; a driving pulley consisting of two coned driving discs so disposed with relation to each other as to form between them an annular groove of keystone section, one of said coned driving discs being movable axially on said engine shaft in such a manner as to vary the effective diameter of said annular groove between said coned driving discs; a compression spring so placed as to force said movable driving disc toward its companion disc, said coned discs being so attached to said engine shaft as to always rotate in synchronism with said engine shaft and thus be driven by said shaft; a driven shaft; a driven pulley consisting of two coned driven discs so disposed with relation to each other as to form between them an annular groove of keystone section, one of said coned driven discs being movable axially on said driven shaft in such a manner as to vary the effective diameter of said annular groove between said coned driven discs, said coned driven discs being so connected to said driven shaft that said coned driven discs rotate at all times in synchronism with said driven shaft and thus drive said shaft; a V-belt passing around said driving and driven pulleys and driven by said driving pulley and driving said driven pulley; a centrifugally operated member carried by said driven pulley and rotating at all times in synchronism therewith and so mounted on said driven pulley that said centrifugally operated member can move outwardly due to centrifugal force caused by its rotation; a compression spring so placed as to cause said movable driven disc to move toward its companion disc; mechanism so placed as to pull said movable driven disc away from its companion disc as said centrifugally operated member moves outwardly; a driving sprocket free to rotate on said driven shaft; a chain driven by said driving sprocket and driving said wheel sprocket; a driven clutch member rigidly connected to and driving said driving sprocket; a driving clutch member rigidly connected to and driven by said driven shaft; a centrifugal member carried by and rotating with said driving clutch member; and mechanism by which said centrifugal member causes said driving clutch member to engage said driven clutch member when said centrifugal member rotates above a critical speed.

ESLEY F. SALSBURY.

REFERENCES CITED

The following references are of record in the file of this patent:

UNITED STATES PATENTS

| Number | Name | Date |
| --- | --- | --- |
| 1,826,675 | Roberts | Oct. 6, 1931 |
| 2,260,797 | Burns | Oct. 28, 1941 |
| 2,287,326 | Reeves et al. | June 23, 1942 |
| 2,294,994 | Maze | Sept. 8, 1942 |
| 2,331,976 | Hare | Oct. 19, 1943 |